United States Patent
Chung

(10) Patent No.: US 8,128,531 B2
(45) Date of Patent: Mar. 6, 2012

(54) KEY INTER LOCK CONTROL SYSTEM AND STARTING DEVICE HAVING THE SAME

(75) Inventor: Jin Sang Chung, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 608 days.

(21) Appl. No.: 12/336,235

(22) Filed: Dec. 16, 2008

(65) Prior Publication Data

US 2009/0298643 A1 Dec. 3, 2009

(30) Foreign Application Priority Data

May 30, 2008 (KR) .................. 10-2008-0051023

(51) Int. Cl.
*F16H 59/74* (2006.01)
*B60W 10/04* (2006.01)
*B60R 25/00* (2006.01)

(52) U.S. Cl. ........................ 477/99; 477/111; 70/237
(58) Field of Classification Search .............. 477/96, 477/99, 111; 180/271; 70/237, 277, 278.2, 70/278.3
See application file for complete search history.

(56) References Cited

U.S. PATENT DOCUMENTS

| | | | | |
|---|---|---|---|---|
| 5,009,295 A * | 4/1991 | Kinkade et al. | ............ | 192/220.2 |
| 5,562,568 A * | 10/1996 | Smale | .............. | 477/99 |
| 5,685,183 A * | 11/1997 | Hattori et al. | ................... | 70/252 |
| 5,759,132 A * | 6/1998 | Osborn et al. | .................. | 477/96 |
| 5,902,209 A * | 5/1999 | Moody | ............. | 477/99 |
| 5,938,562 A * | 8/1999 | Withey | ............... | 477/96 |

FOREIGN PATENT DOCUMENTS

| | | | |
|---|---|---|---|
| JP | 05-246265 | | 9/1993 |
| JP | 07329716 A | * | 12/1995 |
| JP | 2006-192990 A | | 7/2006 |
| KR | 1998-044128 U | | 9/1998 |

* cited by examiner

*Primary Examiner* — Roger Pang
(74) *Attorney, Agent, or Firm* — Morgan, Lewis & Bockius LLP

(57) ABSTRACT

A key interlock control system may include a parking position switch unit configured to detect whether a gearshift lever is located in a parking position; an ignition switch unit configured to be electrically connected to at least a power terminal for supplying electrical power to at least an electric or electronic component by manipulation of an ignition key; and a control unit configured to receive a signal from the parking position switch unit and a signal from the ignition switch unit and to determine whether the ignition key is to be locked by a key interlock unit based on the signals of the parking position switch unit and the ignition switch unit.

8 Claims, 3 Drawing Sheets

| TERMINAL POSITION | IGN S/N | | | | | |
|---|---|---|---|---|---|---|
| | B1 | ACC | IG1 | B2 | IG2 | ST |
| LOCK | | | | | | |
| ACC | O—|—O | | | | |
| ON | O—|—O | O | O—|—O | |
| START | O—| | O | O | | O |

KEY INTER LOCK CONTROL SYSTEM AND STARTING DEVICE HAVING THE SAME

CROSS-REFERENCE TO RELATED APPLICATION

The present application claims priority to Korean Patent Application Number 10-2008-0051023 filed May 30, 2008, the entire contents of which application is incorporated herein for all purposes by this reference.

BACKGROUND OF THE INVENTION

1. Field of the Invention

The present invention relates generally to a key interlock control system, and, more particularly, to a key interlock control system which solves problems of heat and noise generated during operation of a key interlock, and a starting device having the same.

2. Description of Related Art

Generally, for safety purposes, the transmission of a vehicle employs and uses a key interlock system which allows a starting key to be removed from a starting switch only when a gearshift lever is located in a parking position, that is, in a 'P' position. The key interlock system prevents jackrabbit start of a vehicle having automatic transmission, and prevents a vehicle from sliding when the vehicle is parked on sloping ground.

When the gearshift lever moves to a position other than the 'P' position, a parking position switch for detecting the shift of the gearshift lever transmits a signal providing notification that the gearshift lever is moved to a position other than the 'P' position to a control unit, and the control unit checks the signal and then transmits a signal requesting that power be supplied to a solenoid so as to operate a key interlock device. Thereafter, if power is supplied to the solenoid and electricity is conducted through the solenoid, the solenoid operates the key interlock device so that a key is prevented from being removed when the gearshift lever is located in a position other than the 'P' position.

Meanwhile, when the gearshift lever is located in the 'P' position, the control unit cuts off power to the solenoid, that is, cuts off conduction of electricity through the solenoid, so that the key interlock device is not operated, thereby enabling a key to be removed.

However, since a conventional key interlock device operates based on the case where a gearshift lever is located in a 'P' position or located in a position other than the 'P' position, the key interlock device operates whenever the gearshift lever is moved from the 'P' position to an 'R' position, with the result that noise is generated, thereby causing a problem of reducing emotional quality.

Further, since a gearshift lever always operates in a position other than the 'P' position when the vehicle is in motion, a lot of load is placed on a key interlock system which operates when the gearshift lever is located in a position other than the 'P' position. In particular, since the state of conduction of electricity through a solenoid for operating the key interlock system is continued, a problem occurs in that the solenoid is overheated. For these reasons, a problem occurs in that the fatigue life of the solenoid is reduced, so that the lifetime of the key interlock system is reduced.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a key interlock control system which prevents noise from being generated when the location of a gearshift lever is moved, and a starting device having the same.

In an aspect of the present invention, a key interlock control system may include a parking position switch unit configured to detect whether a gearshift lever is located in a parking position, an ignition switch unit configured to be electrically connected to at least a power terminal for supplying electrical power to at least an electric or electronic component by manipulation of an ignition keys and/or a control unit configured to receive a signal from the parking position switch unit and a signal from the ignition switch unit and to determine whether the ignition key is to be locked by a key interlock unit based on the signals of the parking position switch unit and the ignition switch unit.

In case that an IG1 signal of an IG1 terminal of the power terminals is turned on and the gearshift lever is located in the parking position, the control unit may control the key interlock unit to unlock the ignition key. In case that the gearshift lever is not located in the parking position and a state of the IG1 signal is changed from a state in which the IG1 signal is turned on to a state in which the IG1 signal is turned off, the control unit may control the key interlock unit to lock the ignition key. If the state of the IG1 signal is not changed from the state in which the IG1 signal is turned on, the control unit may repeat to determine whether the parking position switch is turned on.

The key interlock unit may include a camshaft configured to be rotated through manipulation of the ignition key, and/or a key interlock configured to restrict rotation of the camshaft according to instruction of the control unit. The key interlock may be configured to restrict rotation of the camshaft in case that the control unit determines that the ignition key is moved from a terminal ON to a terminal ACC based on the signals received from the parking position switch unit and the ignition switch unit.

The key interlock may include a solenoid actuator including a push member and controlled by the control unit, and/or an elastic member coupled to the push member and supplying a biasing force to the solenoid actuator to unlock the ignition key in a normal state, wherein the camshaft includes a receiving notch so that the camshaft is caught by the push member when the solenoid actuator is activated by the control unit, and thereby the camshaft is not rotated and the ignition key is prevented from being removed therefrom.

In another aspect of the present invention, a starting device may include a camshaft configured to be rotated through manipulation of an ignition key, an ignition switch unit configured to be connected to at least a power terminal for supplying electrical power to at least an electric or electronic component by the manipulation of the ignition key, a parking position switch unit configured to detect whether a gearshift lever is located in a parking position, and/or a key interlock unit configured to restrict rotation of the camshaft in case that the ignition key is moved from a terminal ON to a terminal ACC based on signals received from the parking position switch unit and the ignition switch unit.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figures 1, 2:
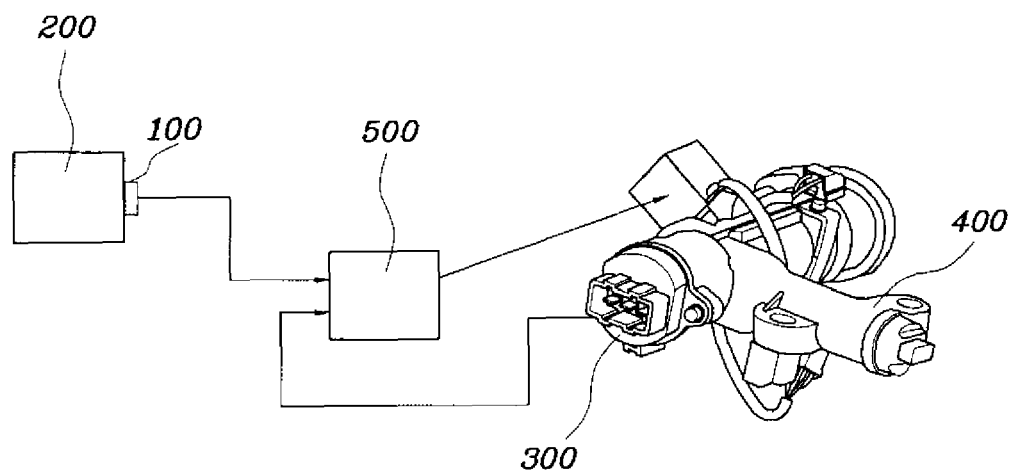
FIG. 1 is a schematic diagram showing an exemplary key interlock control system according to the present invention.
FIG. 2 is a view showing an exemplary power distribution table for the ignition switch unit of the key interlock control system according to the present invention.
Figure 3:
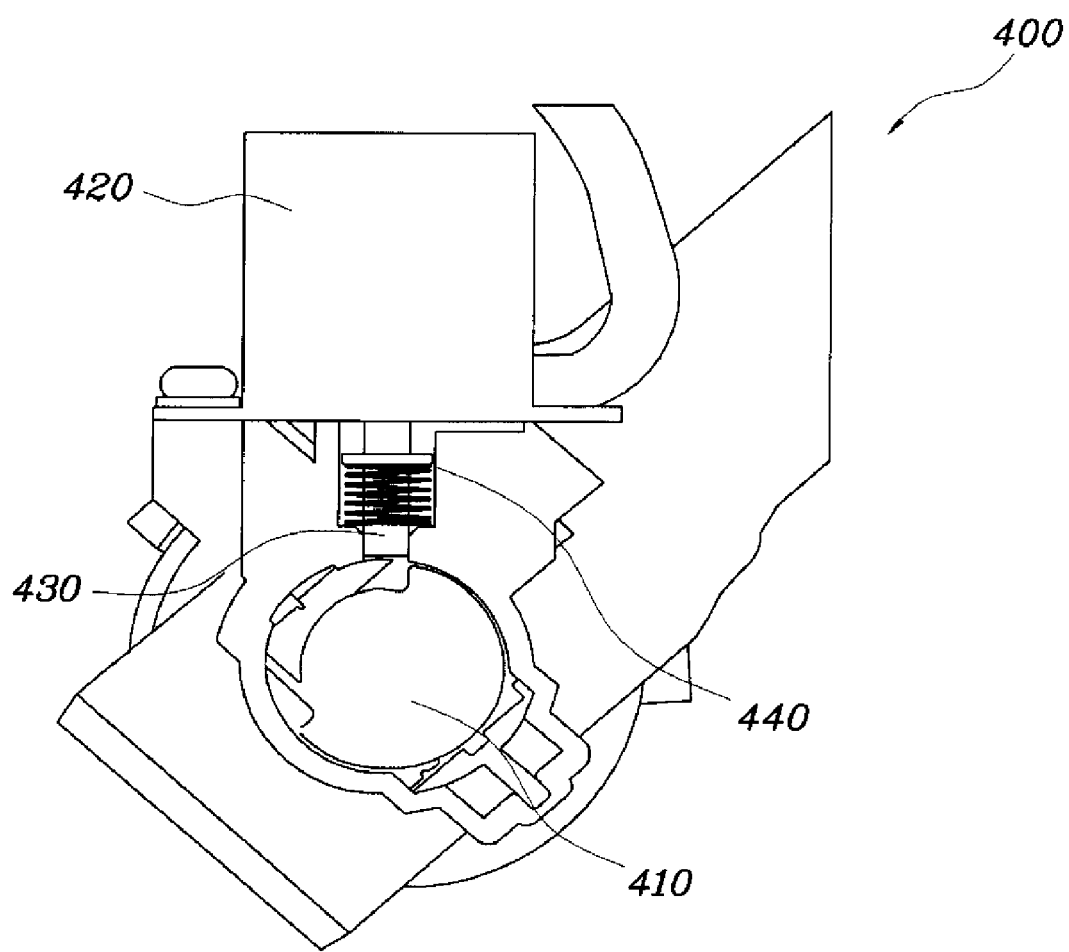
FIG. 3 is a cross-sectional view showing part of an exemplary key interlock unit according to the present invention.
Figure 4:
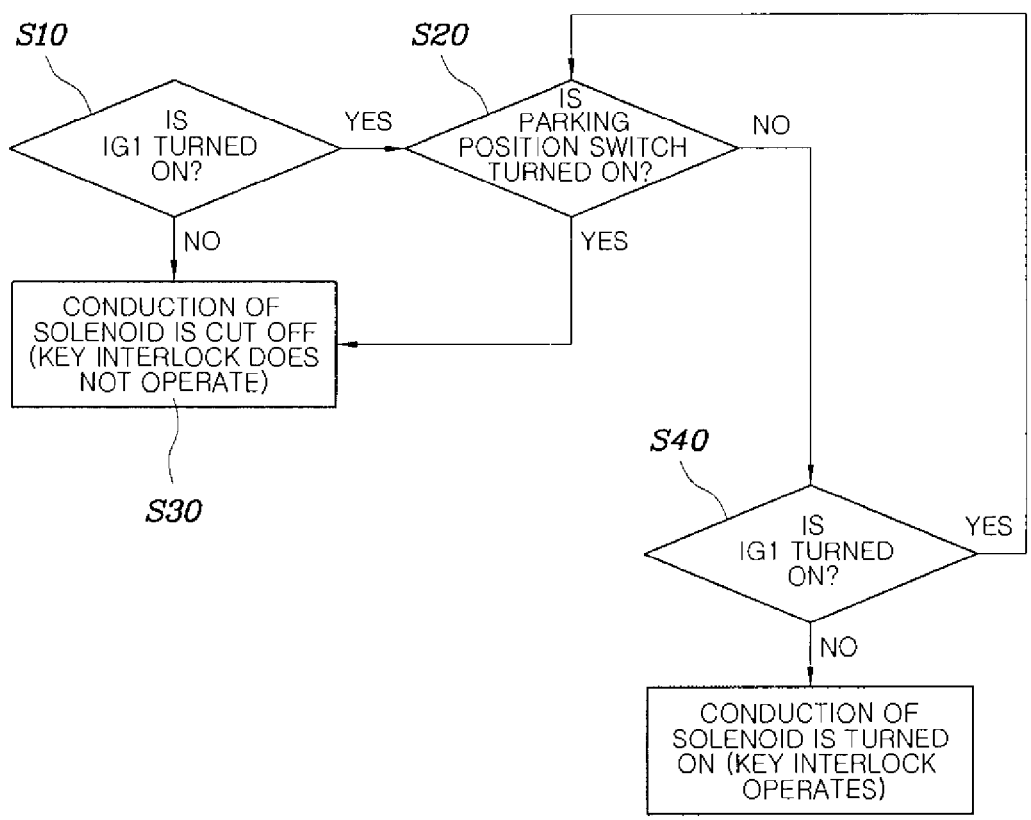
FIG. 4 is a flowchart showing the operation of the key interlock control system according to the present invention.

FIG. 1 is a schematic diagram showing a key interlock control system according to various exemplary embodiments of the present invention. FIG. 2 is a view showing a power distribution table for the ignition switch unit of the key interlock control system according to various exemplary embodiments of the present invention. FIG. 3 is a cross-sectional view showing part of a key interlock according to various embodiments of the present invention, FIG. 4 is a flowchart showing the operation of the key interlock control system according to various embodiments of the present invention.

With reference to FIGS. 1 to 3, the key interlock control system according to various exemplary embodiments of the present invention includes a parking position switch unit 100 configured to monitor whether a gearshift lever 200 is located in a parking position, an ignition switch unit 300 configured to be connected to at least one of power terminals for supplying battery power to various electric or electronic components within a vehicle through the manipulation of a key, and a control unit 500 configured to receive a signal measured by the parking position switch unit 100 and a signal measured by the ignition switch unit 300 and to determine whether the key interlock is operated.

The parking position switch unit 100 is installed on one side of the gearshift lever 200, and performs a function of monitoring the operation of the gearshift lever 200, for example, monitoring whether the gearshift lever 200 is located in the parking position P or not.

If a driver locates the gearshift lever 200 in the P position, the parking position switch unit 100 detects that the gearshift lever 200 is located in the P position and then generates a signal for the P position, for example, an ON signal. Meanwhile, if the driver locates the gearshift lever 200 in a position other than the P position, for example, one of Reverse driving position (R), Neutral position (N), Driving position (D), first position (1), and second position (2), the parking position switch unit 100 generates a signal providing notification that the gearshift lever 200 is located in a position other than the P position, for example, an OFF signal.

The ignition switch unit 300 is provided in the key interlock unit 400. The ignition switch unit 300 performs a function of supplying battery power to the various electric or electronic components within a vehicle according to the operation of an ignition key. Here, the ignition switch unit 300 includes LOCK, ACC, ON and START positions, and a plurality of terminals, and the ignition key can be sequentially located in the terminals.

For example, if the ignition key is located in the ACC position, a B1 terminal is connected to an ACC terminal. If the ignition key is located in the ON position, a B2 terminal is connected to an IG2 terminal and at the same time B1 terminal is connected to the ACC terminal and an IG1 terminal. Further, if the ignition key is located in the START position, the B2 terminal is connected to an ST terminal and at the same time the B1 terminal is connected to the IG1 terminal.

Here, the IG1 terminal is used to supply power to a fuel circuit, an ignition circuit, an electric control circuit, a signal light, and a backup light. The IG2 terminal is used to supply power to lamp, security, air-conditioning, and power window devices. Further, the ACC terminal is used to supply power to a clock and an audio device. The ST terminal is used to supply power to the starting circuit. The B1 terminal indicates battery power for electric or electronic components related to the ACC and IGI terminals. The B2 terminal indicates battery power for electric or electronic components related to the ST and IG2 terminals.

The control unit (a key interlock controller) 500 performs a function of determining whether the key interlock unit 400 is to be operated or not, the determination of which is performed based on signals from the parking position switch unit 100 and the ignition switch unit 300.

That is, the control unit 500 does not operate the key interlock unit 400 so that an ignition key can be removed from the key interlock unit 400 if the gearshift lever 200 is located in the P position, and thus an ON signal is received from the parking position switch 100, and an IG1 signal is received form the ignition switch unit 300, The control unit 500 operates the key interlock unit 400 so that the ignition key is prevented from being removed from the key interlock unit 400 if remaining signals are received.

Although the key interlock controller is used as the control unit, the present invention is not limited thereto and a Body Control Module (BCM) can be used as the control unit.

As shown in FIG. 3, if the control unit 500 generates a signal operating the key interlock unit 400, power is supplied to the solenoid 420 such that electricity is conducted through the solenoid 420, with the result that the solenoid 420 overcomes the elastic force of the central spring 440 of a push unit 430 and pushes the push unit 430, so that the camshaft 410 is caught by the push unit 430. Therefore, the camshaft 410 is not rotated, thereby preventing the key from being removed. Here, the camshaft 410 is operated through the manipulation of an ignition key, for example, the camshaft 410 is configured to be rotated whenever the ignition key is coupled to the camshaft 400 and then moved to the LOCK, ACC, ON, and START positions.

Meanwhile, if the control unit 500 generates a signal causing the key interlock unit 400 not to be operated, the conduction of the electricity through the solenoid 420 is cut off, the push unit 430 returns to the original position due to the elasticity of the spring 440, and the push unit 430 is taken off the camshaft 410 so that the camshaft 410 can move, thereby enabling the key to be removed.

Hereinafter, the operation of the key interlock control system according to various embodiments of the present invention will be described with reference to FIG. 4.

First, the ignition switch unit 300 determines whether an IG1 signal is turned on at step S10. Here, the fact that the IG1 signal is turned on means that the ignition key is located in the ON or START position.

Thereafter, the control unit 500 determines whether an ON signal is generated by the parking position switch unit 100 at step S20. Here, the fact that the ON signal is generated means that the gearshift lever 200 is located in the P position. Accordingly, if the ON signal is generated by the parking position switch unit 100 at step S20, the control unit 500 cuts off the conduction of the electricity through the solenoid so that the key interlock is not operated at step S30.

Thereafter, if it is determined that the ON signal is not generated by the parking position switch 100, it is concluded that the gearshift lever 200 is located in a position other than the P position. After that it is again determined whether the IG1 signal is turned on at step S40. Here, if it is determined that the IG1 signal is not turned on, it is determined that the ignition key is located in the LOCK or ACC terminal, and the conduction of the electricity through the solenoid is turned on so that the key interlock is operated.

As described above, the present invention controls the operation of the key interlock based on the IG1 signal and the ON signal of the parking position switch unit. Therefore, the key interlock is not operated if the ignition key is located at the ON terminal even though the gearshift lever is located in a position other than the P position. For this reason, even though the gearshift lever is changed from the P position to the R position, the key interlock is not operated, thereby preventing noise from being generated.

Further, there is an advantage in that the key interlock is operated when the vehicle is in motion, so that the solenoid is prevented from being overheated due to the continuous conduction of the electricity through the solenoid, thereby increasing the fatigue life of the key interlock.

The present invention does not operate the key interlock if the ignition key is located in the ON position even though the gearshift lever is located in a position other than the parking position, so that nose, generated when the gearshift lever is changed from the P position to the R position, can be removed.

Further, there is an advantage in that the present invention prevents the key interlock from being operated when the vehicle is in motion, so that the solenoid is prevented from being overheated due to the continuous conduction of the electricity through the solenoid, thereby increasing the fatigue life of the key interlock.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A key interlock control system, comprising:
   a parking position switch unit configured to detect whether a gearshift lever is located in a parking position;
   an ignition switch unit configured to be electrically connected to at least a power terminal for supplying electrical power to at least an electric or electronic component by manipulation of an ignition key; and
   a control unit configured to receive a signal from the parking position switch unit and a signal from the ignition switch unit and to determine whether the ignition key is to be locked by a key interlock unit based on the signals of the parking position switch unit and the ignition switch unit,
   wherein an IG1 terminal of the at least a power terminal includes a signal indicating that the ignition key is at either ON or START;
   wherein, when the signal of the IG1 is turned on and the gearshift lever is located in the parking position, the control unit controls the key interlock unit to unlock the ignition key, and
   wherein, in case that the gearshift lever is not located in the parking position and a state of the IG1 signal is changed from a state in which the IG1 signal is turned on to a state in which the IG1 signal is turned oft the control unit controls the key interlock unit to lock the ignition key.

2. The key interlock control system set forth in claim 1, wherein, if the state of the IG1 signal is not changed from the state in which the IG1 signal is turned on, the control unit repeats to determine whether the parking position switch is turned on.

3. The key interlock control system set forth in claim 1, wherein the key interlock unit comprises:
   a camshaft configured to be rotated through manipulation of the ignition key; and
   a key interlock configured to restrict rotation of the camshaft according to instruction of the control unit.

4. The key interlock control system set forth in claim 3, wherein the key interlock is configured to restrict rotation of the camshaft in case that the control unit determines that the ignition key is moved from a terminal ON to a terminal ACC based on the signals received from the parking position switch unit and the ignition switch unit.

5. The key interlock control system set forth in claim 3, wherein the key interlock comprises:
   a solenoid actuator including a push member and controlled by the control unit; and
   an elastic member coupled to the push member and supplying a biasing force to the solenoid actuator to unlock the ignition key in a normal state, wherein the camshaft includes a receiving notch so that the camshaft is caught by the push member when the solenoid actuator is activated by the control unit, and thereby the camshaft is not rotated and the ignition key is prevented from being removed therefrom.

6. A passenger vehicle comprising the key interlock control system set forth in claim 1.

7. A starting device comprising the key interlock control system set forth in claim 1.

8. A passenger vehicle comprising the key interlock control system set forth in claim 7.

* * * * *